United States Patent
Thomas et al.

(10) Patent No.: US 7,810,837 B2
(45) Date of Patent: Oct. 12, 2010

(54) INFLATABLE RESTRAINT SYSTEM WITH DEPLOYMENT TRAJECTORY CONTROLLER

(75) Inventors: Scott D. Thomas, Novi, MI (US); David J. Gorman, Royal Oak, MI (US); Steven E. Morris, Fair Haven, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 9 days.

(21) Appl. No.: 12/364,872

(22) Filed: Feb. 3, 2009

(65) Prior Publication Data

US 2010/0194081 A1    Aug. 5, 2010

(51) Int. Cl.
*B60R 21/045* (2006.01)
(52) U.S. Cl. .................................. 280/730.1
(58) Field of Classification Search .............. 280/730.1, 280/751, 752, 753; 296/70
See application file for complete search history.

(56) References Cited

U.S. PATENT DOCUMENTS

| | | | | |
|---|---|---|---|---|
| 5,536,043 A | * | 7/1996 | Lang et al. | 280/753 |
| 5,931,493 A | * | 8/1999 | Sutherland | 280/753 |
| 6,032,978 A | | 3/2000 | Spencer et al. | |
| 6,039,380 A | * | 3/2000 | Heilig et al. | 296/70 |
| 6,203,057 B1 | | 3/2001 | Spencer et al. | |
| 6,213,497 B1 | | 4/2001 | Spencer et al. | |
| 6,378,902 B2 | * | 4/2002 | Unger et al. | 280/753 |
| 6,435,554 B1 | * | 8/2002 | Feldman | 280/753 |
| 6,758,493 B2 | | 7/2004 | Conlee et al. | |

FOREIGN PATENT DOCUMENTS

WO        0007851        2/2000

* cited by examiner

*Primary Examiner*—Paul N Dickson
*Assistant Examiner*—Robert A Coker
(74) *Attorney, Agent, or Firm*—Quinn Law Group, PLLC (57) ABSTRACT

An inflatable restraint system for selectively restraining an occupant of a motorized vehicle is presented herein. The inflatable restraint system includes a bladder having forward and rearward panel portions. The bladder is attached to the vehicle instrument panel, and configured to transition from a non-expanded state, in which the rearward panel portion is substantially flush with respect to the instrument panel, to an expanded state, in which the rearward panel portion is extended into the passenger compartment distal from the instrument panel. An inflation device is operatively coupled to the bladder, and configured to selectively transition the bladder from the non-expanded state to the expanded state. One or more trajectory control arms are attached at one end to the bladder, and a second end to the vehicle. The trajectory control arms are configured to redirect the bladder along an upward, arcuate path when transitioning to the expanded state.

20 Claims, 4 Drawing Sheets

INFLATABLE RESTRAINT SYSTEM WITH DEPLOYMENT TRAJECTORY CONTROLLER

TECHNICAL FIELD

The present invention relates generally to inflatable restraint systems for occupants of motorized vehicles, and more particularly to supplemental inflatable restraint systems deployable for the knees and lower extremities.

BACKGROUND OF THE INVENTION

Almost all current production automobiles, as part of an overall occupant restraint system, are originally equipped with an array of inflatable restraint devices. The most common of such inflatable restraint devices is the airbag system, which is now more commonly referred to in the art as a Supplemental Restraint System (SRS), Air Cushion Restraint System (ACRS), or Supplemental Inflatable Restraint (SIR) system. Airbag devices are generally located in the passenger compartment of automotive vehicles, and act as a selectively deployable cushion capable of attenuating occupant kinetic energy. Most airbags are also designed to minimize inadvertent movement of the occupant to eliminate involuntary contact with the interior structure of the automobile.

Traditional airbag devices comprise an inflatable airbag module stored behind the vehicle instrument panel (e.g., for passenger-side airbags), mounted to the steering wheel hub (e.g., for driver-side airbags), or packaged within a vehicle seat assembly, side door trim, or headliner trim (e.g., for side-impact airbags). A plurality of sensors, such as accelerometers, wheel speed sensors, gyroscopes, brake pressure sensors, seat occupancy sensors, and similar devices, is strategically located throughout the automobile to detect the onset of a predetermined triggering event. A central airbag control unit (ACU) or sensing and diagnostic module (SDM) monitors the sensor(s), and responsively activates an inflation device, internally located in the airbag module, to produce a flow of inflating gas into an inflatable flexible cushion—i.e., the "airbag", which is also located within the airbag module. The inflating gas causes the airbag cushion to be deployed into the vehicle passenger compartment, toward the vehicle occupant.

Many automotive vehicles are currently being designed with a supplemental inflatable restraint system located on a downward and forwardly inclined portion of the instrument panel, commonly identified as the "knee bolster". The knee airbag, or "KAB", can be extended so as to restrain the lower half of the occupant, engaging the knees and lower portions of the legs. During a predetermined triggering condition, the knee airbag cushion is inflated, traditionally passing or breaking through a rearward-facing surface of the knee bolster, in a manner similar to that described above with respect to traditional passenger airbag systems.

As an alternative to conventional KAB modules, inflatable knee bolsters have been developed to enhance vehicle occupant restraint in the event of sudden vehicle deceleration. Much like their conventional counterparts, the inflatable knee bolster is designed to increase the duration of occupant deceleration, and control occupant kinematics. Past inflatable knee bolster installations consist of an inflatable airbag cushion sandwiched between a movable, exterior impact surface, and a fixed-in-place interior surface.

The actuable knee bolster is arranged such that the bolster impact surface is movable from an undeployed position, where it sits flush against the instrument panel, to a deployed position, in which it extends rearward within the passenger compartment. When the inflator is triggered, the airbag cushion rapidly expands to move the impact surface a predetermined distance to the deployed position to intercept an occupant's knees early in the impact event. The inflatable knee bolster then deforms under load, absorbing kinetic energy and minimizing reaction forces. This provides the knees more time to decelerate to the vehicle's final velocity. The initial positioning of the bolster impact surface in a retracted, stored position allows more styling flexibility, and enhances ease of occupant ingress and egress.

During deployment, inflatable knee restraints, such inflatable knee bolsters are traditionally designed to expand in a direction perpendicular to their mounting angle. Since knee bolsters are angled downward, this results in a rearward and downward deployment trajectory. Due to the downward deployment direction, it may not be possible to optimally align the inflated restraint with the occupant.

SUMMARY OF THE INVENTION

According to one embodiment of the present invention, an inflatable restraint system for selectively restraining an occupant of a motorized vehicle is provided herein. The restraint system includes a formed bladder having forward and rearward panel portions. The bladder is designed to attach to the instrument panel, and configured to transition from a non-expanded state, in which the rearward panel portion is substantially flush with respect to the instrument panel, to an expanded state, in which the rearward panel portion is extended into the passenger compartment distal from the instrument panel. An inflation device is operatively coupled with the bladder, and configured to selectively transition the bladder from the non-expanded state to the expanded state. One or more trajectory control arms are attached at a first end thereof to the bladder, and operatively attachable at a second end thereof to the vehicle. The trajectory control arm(s) are configured to redirect the bladder along an upward path when transitioning from the non-expanded state to the expanded state.

According to one aspect of this particular embodiment, the trajectory control arm(s) comprise first and second control straps each fixed at the first end thereof to a respective lateral side portion of the bladder. In addition, or as an alternative thereto, the trajectory control arm(s) may be fixed to a central portion of the bladder. It is also possible that each trajectory control arm includes two anchor plates: a first anchor plate attaching the first end of the trajectory control arm to the bladder, and a second anchor plate for attaching the second end of the trajectory control arm to the vehicle.

In accordance with another facet of this embodiment, the inflatable restraint system includes a reaction plate configured to operatively attach to the vehicle inside the instrument panel. The reaction plate is operatively attached to the bladder, at least in part, via the trajectory control arm(s). The reaction plate is fabricated from a material of sufficient rigidity and resiliency to provide a reaction surface for the bladder when transitioning to the expanded state. In one exemplary embodiment, the reaction plate is fabricated, at least partially, from a metallic material, such as aluminum or steel sheet stock. In this instance, the trajectory control arm(s) are integrally formed with the reaction plate. Each trajectory control arm may include an extension loop that allows for longer overall arm lengths that packaging constraints may otherwise prevent.

As part of yet another facet, the reaction plate is rigidly mounted to the vehicle via first and second knee bolster brackets. The knee bolster brackets may be separate, individual components that are subsequently mechanically secured to the reaction plate, or may be integrally formed with the reaction plate. Each of the knee bolster brackets projects from a respective lateral end portion of the reaction plate, preferably in an orthogonal manner.

According to yet another aspect of this embodiment, the inflatable restraint system may include a vertical travel stop feature. For example, the reaction plate may be fabricated with an elongated slot that receives and mates with a travel stop that projects outward from the forward panel portion of the bladder. The travel stop is configured to slide within the slot, and bottom out against a slot end when the bladder travels a predetermined vertical distance while transitioning from the non-expanded state to the expanded state.

As part of another aspect, the inflatable restraint system also includes a reverse travel mechanism that is designed to prevent the bladder from transitioning back from the expanded state to the non-expanded state. In one preferred approach, the reverse travel mechanism includes one or more triangular teeth that protrude from the forward panel portion of the bladder. These teeth are configured to land against (i.e., ground out on) a corresponding number of triangular teeth that protrude from a rearward surface of the reaction plate if the bladder attempts to transition back from the expanded state to the non-expanded state.

In accordance with even yet another facet, the bladder is a single-piece, monolithic structure. By way of example, the bladder may be fabricated from blow molded plastic or other suitable polymers. Ideally, the bladder is constructed with a plurality of bellows that are configured such that the rearward panel portion articulates away from the forward panel portion, in an "accordion-like" manner, when the bladder is transitioning from the non-expanded state to the expanded state. At least one, but preferably most of the bellows extends continuously along an outer perimeter of the bladder's forward panel portion. In this instance, the first and second control straps are fixed to a respective lateral side portion of the bladder laterally outward of the bellows—i.e., outside of the inner area delineated by the bellows.

In an additional facet of this embodiment, the inflatable restraint system includes a stiffener panel operatively attached to the rearward panel portion of the bladder. The bladder is fabricated, at least partially, from one material, whereas the stiffener panel is fabricated, at least partially, from a different material that is harder and more rigid than the bladder material.

As an optional feature for this first embodiment, the inflatable restraint system may be designed with an expandable steering column shroud. The steering column shroud is operatively attached to an upper edge portion of the bladder, and configured to expand from a stored position to an expanded position. In the expanded position, the steering column shroud is disposed between the vehicle steering column and bladder, and acts as an energy absorbing barrier. The kinetic energy generated when the bladder transitions from the non-expanded state to the expanded state is utilized to expand the steering column shroud from the stored position to the expanded position.

According to another embodiment of the present invention, an inflatable knee bolster apparatus for selectively restraining an occupant of a motor vehicle is provided. The vehicle has a passenger compartment with an instrument panel mounted at a forward end therein. The instrument panel includes an upper portion and a rearwardly-inclined lower portion with a generally-vertical middle portion that extends therebetween.

The inflatable knee bolster apparatus includes a rigidly formed bladder having forward and rearward panel portions that cooperatively define a fluid chamber therebetween. The bladder is designed to attach to the lower portion of the instrument panel. The bladder is configured to transition from a non-expanded state, in which the rearward panel portion is substantially flush with respect to the instrument panel, and an expanded state, in which the rearward panel portion is extended into the passenger compartment distal from the instrument panel.

A fluid dispensing apparatus is fluidly coupled to the fluid chamber of the bladder. The fluid dispensing apparatus is selectively operable to dispense inflation fluid into the fluid chamber. Activation of the fluid dispensing apparatus operates to transition the bladder from the non-expanded state to the expanded state. A plurality of trajectory control arms are fixed at one end to the bladder, and operatively attachable at a second end thereof to the vehicle. The trajectory control arms are configured to redirect the bladder along an arcuate path when transitioning from the non-expanded state to the expanded state.

According to yet another embodiment of the present invention, a motorized vehicle is provided, which includes an instrument panel and an inflatable knee airbag apparatus. The instrument panel is mounted inside of the vehicle, at a forward end of the vehicle passenger compartment. The instrument panel has an upper portion and a rearwardly-inclined lower portion with a generally-vertical middle portion that extends therebetween.

The inflatable knee airbag apparatus includes a bladder with integrally formed forward and rearward panel portions that cooperatively define a fluid chamber therebetween. The bladder is operatively mounted to the lower portion of the instrument panel, and configured to transition from a non-expanded state, in which the rearward panel portion is substantially flush with respect to the instrument panel, and an expanded state, in which the rearward panel portion is extended into the passenger compartment distal from the instrument panel. A fluid dispensing apparatus is fluidly coupled to the fluid chamber, and selectively operable to dispense inflation fluid thereto. Activation of the fluid dispensing apparatus operates to transition the bladder from the non-expanded state to the expanded state.

A reaction plate is mounted to an inner support structure of the vehicle, inside of the instrument panel. A plurality of trajectory control arms are each fixed at a first end thereof to the forward panel portion of the bladder at a first height. Each control arm is integrated (i.e., integral with or attached to) at a second end thereof to the reaction plate at a second height that is higher than the first height. The plurality of trajectory control arms are configured to redirect the rearward panel portion of the bladder in an upward motion along an arcuate path when transitioning from the non-expanded state to the expanded state.

The above features and advantages, and other features and advantages of the present invention, will be readily apparent from the following detailed description of the preferred embodiments and best modes for carrying out the present invention when taken in connection with the accompanying drawings.

DESCRIPTION OF THE PREFERRED EMBODIMENTS

The drawings presented herein are not to scale—the dimensions and relative orientations of the constituent components shown throughout the drawings are intentionally exaggerated for clarity and a better understanding of the present invention. Thus, the individual and relative dimensions and orientations shown in the drawings are not to be considered limiting. In addition, the use of certain adjectives in the specification and claims, such as "inner", "outer", "upper", "lower", "forward", "rearward", etc., are intended, unless indicated otherwise, to specify the comparative orientation of a given component relative to the vehicle when operatively mounted thereto.

Figure 1A:
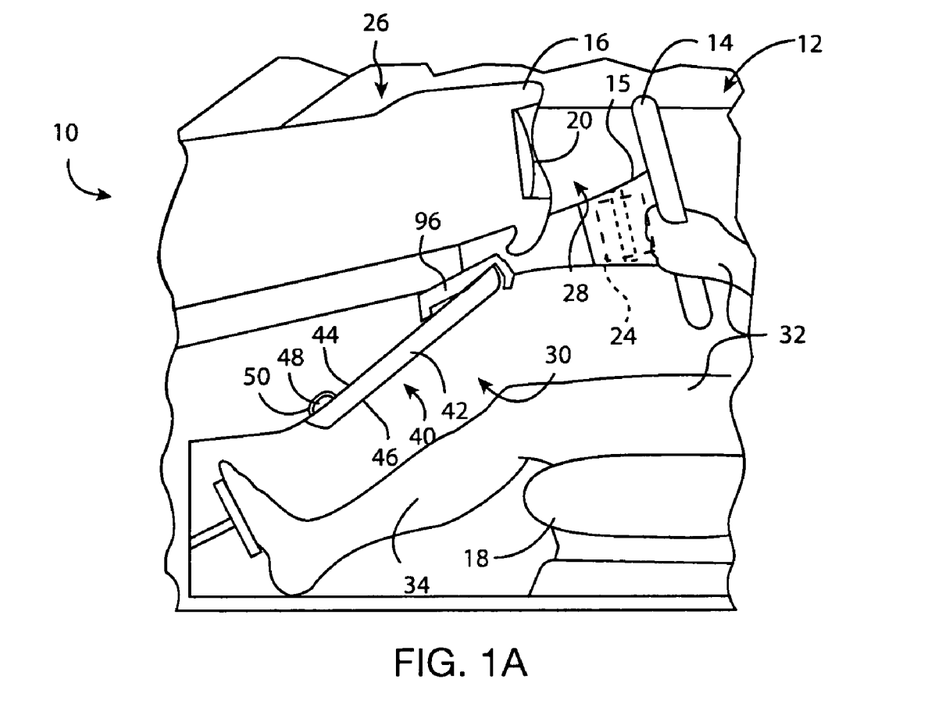
FIG. 1A is a partially cut-away, side-view illustration of a portion of the passenger compartment of an exemplary motorized vehicle with an inflatable restraint system in accordance with the present invention operatively mounted therein, showing the actuable bladder in a non-expanded state.
Figure 1B:
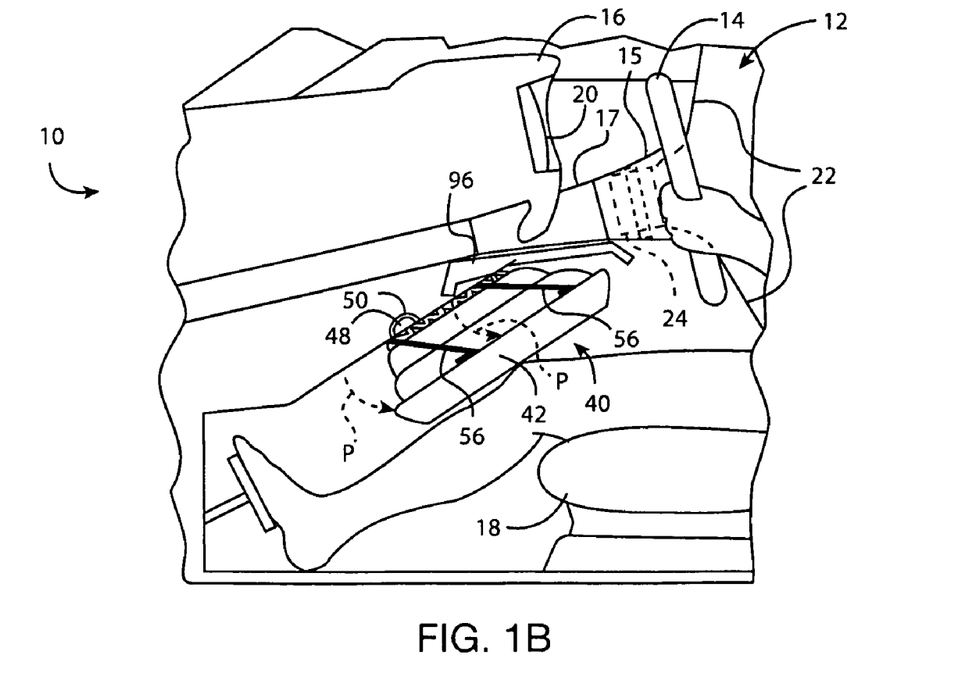
FIG. 1B is another illustration of the passenger compartment of FIG. 1A, showing the actuable bladder in an expanded state.

Referring to the drawings, wherein like reference numerals refer to like components throughout the several views, shown generally at 10 in FIGS. 1A and 1B is an exemplary motor vehicle for utilizing the inflatable restraint systems of the present invention. The present invention is described herein in the context of the standard passenger vehicle of FIGS. 1A and 1B. The present invention, however, may just as easily be incorporated into any motorized vehicle platform. By way of example, the inflatable restraint systems of the present invention can be incorporated into other vehicle platforms, such as, but certainly not limited to, light trucks, heavy duty vehicles, sport utility vehicles (SUVs), construction vehicles, vans, buses, airplanes, trains, etc.

The vehicle 10 includes an interior compartment, in this case a passenger compartment, which is indicated generally at 12, with vehicle interior structure. The vehicle interior structure is collectively represented herein by a steering wheel 14, an instrument panel 16, and one or more seat assemblies 18, but may also include a headliner, pillar structure, one or more door assemblies, etc. The instrument panel 16 houses, for example at the driver side, an electronic instrument cluster 20 with various digital or analog gauges—e.g., speedometer, odometer, and tachometer (not shown), or, at the front passenger side, a glove compartment (not shown).

As would be readily recognized by a person having ordinary skill in the art, the front of the vehicle 10 is to the left in FIGS. 1A and 1B, whereas the rear of the vehicle 10 would be to the right.

A traditional "driver-side" airbag assembly is shown hidden in FIGS. 1A and 1B. The traditional airbag assembly is represented by an inflatable bag 22 (illustrated in FIG. 1B) that is housed within an airbag module, shown hidden at 24, that is mounted inside of the steering wheel hub 15. The inflatable bag 22 is shown in an undeployed condition in FIG. 1A, and in an inflated condition in FIG. 1B, extending rearward into the passenger compartment 12. Since the traditional airbag assembly, per se, is not the subject of this invention, it has been greatly simplified, it being understood that further information regarding the standard operation of a drive-side airbag may be found in the prior art.

Referring now to FIG. 1A, the instrument panel 16, or "IP" for short, can be divided into three general segments: an upper, a middle, and a lower portion, designated generally by reference numerals 26, 28 and 30, respectively. As can be seen in FIG. 1A, the upper and lower portions 26, 30 of the IP 16 extend in a generally rearward direction relative to the vehicle 10, each having a rearwardly oriented inclination. The middle portion 28, on the other hand, extends between the upper and lower portions 26, 30 of the IP 16 in a generally vertical orientation, angled with a forward inclination above the steering column 17 (FIG. 1B).

In accordance with the present invention, the vehicle 10 includes an inflatable restraint system, designated generally as 40 in FIGS. 1A and 1B, for selectively restraining an occupant 32. In the embodiment presented in FIGS. 1A and 1B, the inflatable restraint system 40 is intended to be mounted inside of the passenger compartment 12, to the lower portion 30 of the IP 16, underneath the steering column 17. In this particular arrangement, the inflatable restraint system 40, which is also referred to as "inflatable knee bolster", is actuable, as described hereinbelow, to intercept and restrain the lower half of the occupant 32, engaging the occupant's knees and lower portions of the legs 34. The inflatable restraint system 40 may be attached to other sections of the IP 16—e.g., to the lower portion 30 of the IP 16, on the passenger side of the vehicle 10, or other vehicle structure, such as the vehicle seat assembly 18, the glove box, the HVAC system, etc., without departing from the intended scope and spirit of the present invention.

Figure 8:
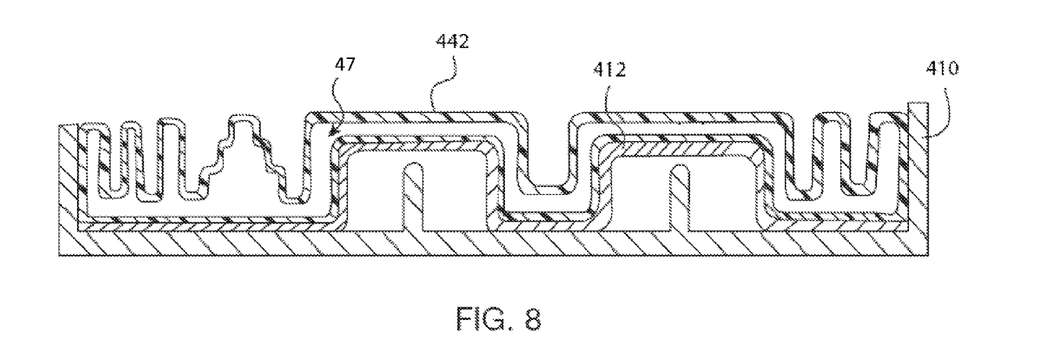
FIG. 8 is a cross-sectional, side-view illustration of an inflatable bladder with an optional exterior show-surface panel and intermediate stiffener panel in accordance with the present invention.

The inflatable restraint system 40 includes an expandable, formed bladder 42. The bladder 42 is preferably a single-piece, generally monolithic structure that maintains its shape in its undeployed condition but can expand when filled with gas during deployment. By way of example, the bladder may be fabricated from blow molded plastic, such as polyolefin-based plastics, and other thermoplastics and suitable polymers. The bladder 42 includes an integrally formed forward panel portion 44 that is in opposing spaced relation to a rearward panel portion 46. The forward and rearward panel portions 44, 46 cooperatively define a fluid chamber 47 (best seen in FIG. 8) therebetween. A number of strengthening ribs 49 (FIG. 2) are formed in the forward-facing panel portion 44. The strengthening ribs 49 project inwardly into the fluid chamber 47, into close proximity with the inner side of rearward-facing panel portion 46, as best seen in FIG. 8. 44. The strengthening ribs 49 project inwardly into the fluid chamber 48, into close proximity with the inner side of rearward-facing panel portion 46, as best seen in FIG. 8.

In addition to the bladder 42, the inflatable restraint system 40 also includes an inflation fluid dispensing apparatus (or "inflation device") 48. In the embodiment shown, the inflation device 48 is attached to the bladder 42, encased within an inflator pocket 50 preformed in the forward-facing panel portion 44. Alternatively, the inflation device 48 may be packaged in a remote location relative to the bladder 42, whereat the two constituent members are fluidly coupled through a fill tube or other fluid conduit, without departing from the intended scope of the present invention. The inflation device 48 has a generally cylindrical body which acts as a pressure vessel used to store inflation gas or propellant that is transformed into gas upon ignition. A discharge port (not visible in the views provided) is located at one end of the cylindrical inflator body. A second end of the inflator has an electrical terminal 52 adapted to receive an activation signal. The relative orientation of the terminal and discharge port may me modified to accommodate the design and packaging requirements of a particular application.

Sensors (not shown) mounted to the vehicle 10 are connected in signaling communication with an on-board vehicle controller or computer of conventional construction that is electrically coupled to electrical terminal 52 of the inflation fluid dispensing apparatus 48. Under certain predetermined conditions, one or more sensors emit a signal to the controller, which, in turn may transmit a triggering signal to the inflation fluid dispensing apparatus 48 to regulate inflation of the inflatable bladder 42. Notably, the inflatable restraint system 40 may be used in conjunction with, or independent of the traditional airbag assembly—i.e., inflatable bag 22 and airbag module 24, shown in FIGS. 1A and 1B.

The inflation fluid dispensing apparatus 48 acts as a pyrotechnic device, used to store (in a solid, liquid, or gaseous state) and discharge inflation gas. That is, the inflation device 48 is selectively actuable to dispense a fluid, preferably in the nature of a pressurized gas, such as nitrogen, argon, or carbon dioxide. In doing so, the inflation device 48 is operable to rapidly transition the inflatable bladder 42 from a non-expanded state (exemplified in FIG. 1A) to an expanded state (illustrated in FIG. 1B). For example, the bladder 42 is shown in a non-expanded, stored position in FIG. 1A, wherein the rearward panel portion 46 lies substantially flush against the instrument panel 16, and the remainder of the inflatable restraint system 40 is housed within the IP 16. Upon activation of the inflation device 48 (e.g., via a triggering signal sent to electrical terminal 52 by the on-board vehicle controller), inflation gas is discharged from the discharge port into the interior of the bladder 42. As inflation gas is forced into the bladder 42, pressure increases inside of the fluid chamber 48, causing the bladder 42 to inflate. As the bladder 42 inflates, it expands outward, propelling the rearward panel portion 46 into the passenger compartment 12, away from the instrument panel 16, in a rearward direction toward the seat assembly 18.

The bladder 42 is releasably attached to the IP 16, allowing for free movement of the bladder 42 when deployed and transitioning to the expanded state. In the embodiment of FIG. 1A, for example, the bladder 42 fits into a complementary opening formed through the lower portion 30 of the IP 16. A first pair of integrally formed and frangible mounting tabs 36 (FIG. 2) extend from a bottom edge of the bladder 42 for attachment (e.g., by screws, bolts, rivets or other fastening means) to the instrument panel 16. Likewise, a second pair of integrally formed frangible mounting tabs 38 (FIG. 2) extend from a top edge of the bladder 42 for attachment to the IP 16. Other manners of releasably attaching the bladder 42 to the IP 16 are possible and envisioned, as will be understood with reference to the description of FIGS. 4 and 5 below.

Figures 2, 3:
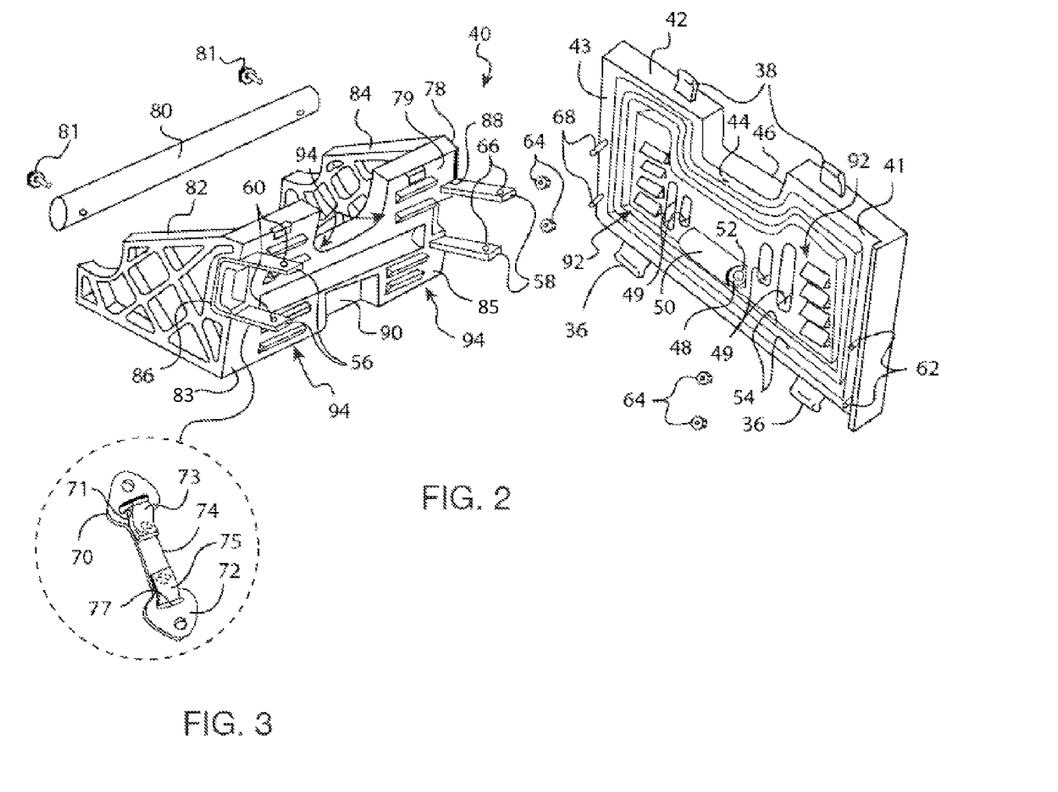
FIG. 2 is an exploded, perspective-view illustration of an inflatable restraint system in accordance with one embodiment of the present invention.
FIG. 3 is a perspective view illustration of an optional control strap configuration in accordance with the present invention.

Looking then to FIG. 2, the bladder 42 is constructed with a plurality of bellows 54. The bellows 54, which can be characterized as "accordion pleats", are configured such that the rearward-facing panel portion 46 articulates away from the forward-facing panel portion 44 in an "accordion-like" manner when the bladder 42 transitions from the non-expanded state (FIG. 1A) to the expanded state (FIG. 1B). For instance, during the onset of a predetermined triggering event, the inflator 48 pressurizes the fluid chamber 47 until the bladder 42 expands with sufficient force to detach the frangible tabs 36, 38, during which the bellows 54 incrementally unfold. At least one, but preferably all of the bellows 54 extends in a continuous, uninterrupted manner around the outer perimeter of the bladder's forward panel portion 44. Utilizing this configuration allows the rearward panel portion 46 to telescope outward generally rectilinearly. Note that within the scope of this invention, the bellows can be geometrically sized so that non-rectilinear motion occurs and a trapezoidal or triangular deployed bellows cross-section results.

In accordance with the present invention, one or more trajectory control arms are attached to the bladder 42, and configured to redirect the bladder 42 along an upward, arcuate path (represented by hidden arrows P in FIG. 1B) when transitioning from the non-expanded state to the expanded state. According to this particular embodiment, the trajectory control arm(s) comprise two pairs of control straps: a first pair of control straps 56 laterally spaced from a second pair of control straps 58 (visible in FIG. 2). Each of the first pair of controls straps 56 is fixed at a respective first end thereof to a first lateral side portion 41 of the bladder 42, along the forward panel portion 44. Likewise, each of the second pair of control straps 58 is fixed at a respective first end thereof to a second lateral side portion 43 of the bladder 42, along the forward panel portion 44. For example, the first pair of control straps 56 are each formed with a hole 60 through the first end thereof. Each hole 60 is configured to receive a complementary stud 62, which is insert molded into the forward-facing panel portion 44 of the bladder 42. A nut 64 is then threaded onto a distal end of the stud 62, and tightened until the control strap 56 is locked to the bladder 42. Likewise, the second pair of control straps 58 are also formed with a hole 66 through the first end thereof. Each hole 66 is configured to receive a complementary stud 68, which is insert molded into the forward panel portion 44 of the bladder 42, and locked thereto with a nut 64.

It should be recognized that the trajectory control arm(s) may be operatively attached to the bladder 42 in other arrangements, employing that same or different means of attachment. In one optional configuration, each trajectory control arm can be constructed with a pair of anchor plates. As seen in FIG. 3, for example, a first anchor plate 70 is attached to a first end 73 of a fabric trajectory control strap 74. The first anchor plate 70 is secured to the fabric control strap 74 by passing the first end 73 through a slot 71 formed through the first anchor plate 70. The first end 73 is then folded back onto the control strap 74, and sewn or otherwise fixed in place. Similarly, a second anchor plate 72 is secured to a second end 75 of the fabric trajectory control strap 74 by threading the second end 75 through a slot 77 in the anchor plate 72, folding the second end 75 back onto the control strap 74, and sewing it in place. The first anchor plate 70 can be used to attach the first end 73 of the trajectory control arm 74 to the bladder 42, and the second anchor plate 72 can be used to attach the second end 75 of the trajectory control arm 74 to the vehicle 10. It is certainly possible to use other attachment means besides those illustrated herein to attach the trajectory control arm to the expandable bladder.

Figure 6:
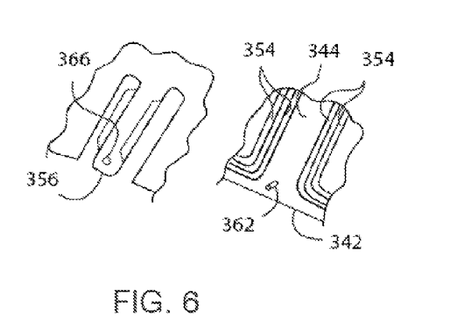
FIG. 6 is a partial perspective-view illustration of an optional trajectory control arm/bladder interface in accordance the present invention.

To this regard, the trajectory control arm can be fixed to different locations on the expandable bladder 42. For instance, each trajectory control arm may be fixed to a central portion of the bladder, as illustrated in FIG. 6. In this optional arrangement, a control arm 356 is fixed to a central portion of an expandable bladder 342. A hole 366 formed through the control arm 356 is configured to receive a complementary stud 362, which is insert molded into a central region of the forward panel portion 344 of the bladder 342, and locked thereto with a nut. The orientation of the bellows 354 may then be modified to accommodate this different control arm-bladder interface, as exemplified in FIG. 6. It should be recognized that the trajectory control arm(s) may be attached to other sections of the bladder, such as the middle or a top, bottom, or side edge, within the scope of the inventions claimed herein.

With continuing reference to FIG. 2, the inflatable restraint system 40 includes a reaction plate 78, which operates as a reaction surface for the inflatable bladder 42 when transitioning from the non-expanded state (FIG. 1A) to the expanded state (FIG. 1B). For example, upon actuation of the inflation device 48, the inflating bladder 42 will generate a forwardly oriented component of force directed toward the front of the vehicle 10, and a generally vertical component of force directed toward the top of the vehicle 10. The reaction plate 78 is operatively oriented with respect to the bladder 42 such that a reaction force will tend to build up along a rearward- and partially downward-facing surface 79 of the reaction plate 78. In so doing, the reaction plate 78 acts to restrict the bladder 42 from any forward motion, effectively directing the bladder 42, namely rearward panel portion 46, out into the passenger compartment 12—e.g., between the seat assembly 18 and the instrument panel 16, as seen in FIG. 1B.

To provide a reaction surface for the bladder 42, the reaction plate 78 is fabricated from a material of predetermined rigidity and resiliency. In the embodiment of FIG. 2, for example, the reaction plate 78 is a monolithic panel that is fabricated from a semi-rigid plastic, such as polyvinyl chloride (PVC), polypropylene, etc. Other materials may be employed for fabricating the reaction plate 78, as will be evident from the description with respect to FIGS. 4 and 5 hereinbelow.

The reaction plate 78 is configured to operatively attach to the vehicle 10, inside the IP 16. In general, the reaction plate 78 is mounted to an inner support structure of the vehicle 10, such as cross-car beam 80, which extends laterally inside of the instrument panel 16. In this embodiment, the reaction plate 78 is rigidly mounted to the cross-car beam 80 via first and second knee bolster brackets 82 and 84, respectively, which are configured to receive and threadably mate with hex-bolts 81. The knee bolster brackets 82, 84 may be separate, individual components that are subsequently mechanically secured to the reaction plate 78 (e.g., via heat stakes, sonic welding, screws, bolts, or other fasteners), or may be integrally formed with the reaction plate 78, which is the case in FIG. 2. Each of the knee bolster brackets 82, 84 projects from a respective lateral end portion of the reaction plate 78, preferably in an orthogonal manner.

The reaction plate 78 is operatively attached to the bladder, at least in part, via the trajectory control arm(s). In the embodiment of FIG. 2, the first pair of control straps 56 is passed through a first receiving channel 86 preformed in a first lateral end-portion 83 of the reaction plate 78. In addition, the second pair of control straps 58 is passed through a second receiving channel 88 preformed in a second lateral end-portion 85 of the reaction plate 78. Each of the receiving channels 86, 88 secure a respective pair of straps 56, 58 to the reaction plate 78.

To facilitate redirecting the expanding bladder 42 along the arcuate, upward path P, the control straps 56, 58 are fixed at their respective first ends to the forward panel portion 44 of the bladder 42 at a first height relative to the vehicle, whereas the second end of each control arm is integrated to (i.e., integral with or attached to) the reaction plate 78 at a second height that is higher than the first height (see FIG. 1B). This type of differential-height interface transforms the control straps into swing arms, rather than merely rectilinear travel stops. An inflator cavity 90 is also formed in a lower central region of the reaction plate 78. The inflator cavity 90 is shaped and sized to nestably stow the inflation device 48 therein when the bladder 42 is in the non-expanded, stored position (FIG. 1A).

As part of another aspect of this invention, the inflatable restraint system 40 may be designed with a reverse travel mechanism that is designed to prevent the bladder 42 from moving/sliding downward along the reaction plate 78 during loading thereof. In one preferred approach, the reverse travel mechanism includes a first array of triangular teeth, indicated generally at 92 in FIG. 2, that protrude from the forward panel portion 44 of the bladder 42. Correspondingly, a second array of triangular teeth, indicated generally at 94, protrude from the rearward-facing surface 79 of the reaction plate 78. Each of the first array of triangular teeth 92 has a bottom surface, which is generally orthogonally oriented with respect to the forward panel portion 44, that is configured to land against (i.e., ground out on) a corresponding upper surface of the second array of triangular teeth 94 if the bladder 42 attempts to transition along its mounting axis adjacent the reaction plate 78 during loading by the occupant, as illustrated in FIG. 1B.

As an optional feature for this first embodiment, the inflatable restraint system 40 may be designed with an expandable steering column shroud 96. The steering column shroud 96 is operatively attached to an upper edge portion of the bladder 42, and configured to expand from a stored position, illustrated in FIG. 1A, to an expanded position, illustrated in FIG. 1B. Ideally, the kinetic energy generated when the bladder 42 is transitioning to the expanded state (FIG. 1B) is utilized to expand the steering column shroud 96 from the stored position to the expanded position. In the expanded position, the steering column shroud 96 is disposed between the vehicle steering column 17 and the bladder 42. The shroud 96 acts as an energy absorbing barrier between the occupant's legs 34 and the steering column 17.

Figure 4:
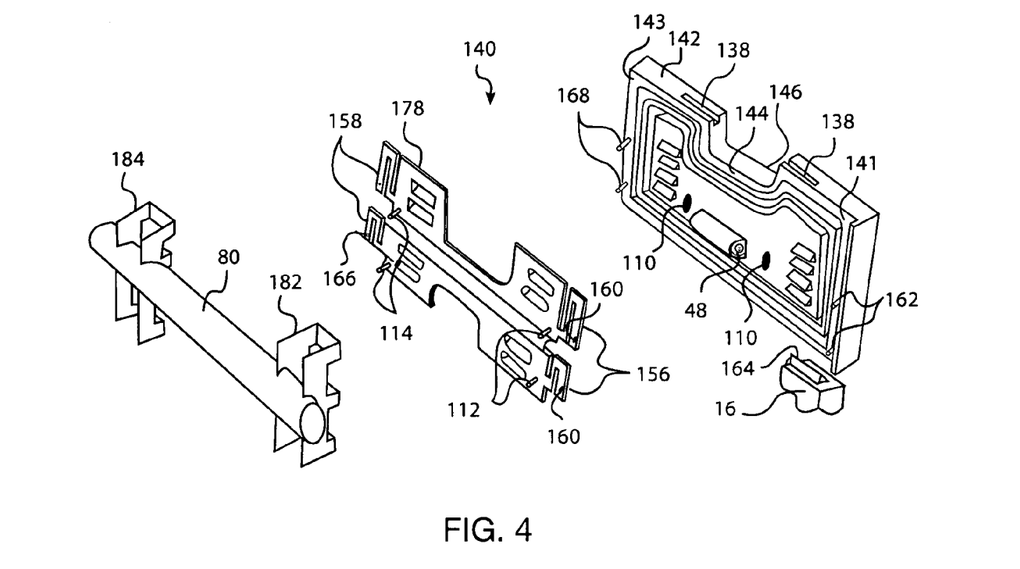
FIG. 4 is an exploded, perspective-view illustration of an inflatable restraint system in accordance with another embodiment of the present invention.

FIG. 4 illustrates a separate embodiment of the present invention that functions similarly to the previously described inflatable knee bolster 40 of FIGS. 1A, 1B, and 2. For simplicity and brevity, like reference numbers are used in FIG. 4 to identify like components from FIGS. 1A and 1B. An exploded perspective view of an inflatable restraint system, indicated generally by reference numeral 140, is shown in FIG. 4 in accordance with an alternate embodiment of the present invention. The inflatable restraint system 140 includes an expandable, yet formed bladder 142 and an inflation fluid dispensing apparatus 48, which are similarly configured and operatively coupled to function as described above with respect to the bladder 42 and inflation device 48 of FIGS. 1A and 1B.

One of the optional features presented in the embodiment of FIG. 4 is the introduction of exhaust vents 110 that are formed in the forward-facing surface 144 of the bladder 142. The exhaust vents 110 function to evacuate inflation fluid from the fluid chamber formed between the integrally formed forward panel portion 144 that is in opposing spaced relation to a rearward panel portion 146. The vents 110 allow inflation fluid to pass into the surrounding atmosphere, resulting in less aggressive deployment and restraint force of the bladder 142.

The bladder 142 is also configured to releasably attach to the IP 16, allowing for free movement of the bladder 142 when deployed and transitioning to the expanded state. Unlike the embodiment of FIG. 2, the embodiment of FIG. 4 includes a snap feature for releasably engaging the bladder 142 and IP 16. In this instance, a pair of transversely oriented upper channels 138 is integrally formed along an upper edge of the bladder 142. Likewise, a transversely oriented lower channel (not visible in the views provided) is integrally formed along a lower edge of the bladder 142. In accordance with this design, the bladder 142 may then be pressed into a complementary opening in the IP 16 such that both the upper and lower channels receive or "snap" onto a respective snap-lip, one of which is illustrated for explanatory purposes at 164 in FIG. 4, that protrudes from the outer peripheral edge of an opening in the IP 16. By snapping the upper and lower channels into engagement with the peripherally oriented snap-lip 164, bladder 142 is temporarily engaged with the IP 16, and releasable therefrom upon activation of the inflation device 48. Alternatively, the male and female portions of this snap attachment may be reversed on these parts.

Similar to the embodiment of FIGS. 1A and 1B, the inflatable restraint system 140 of FIG. 4 includes a reaction plate 178, which operates as a reaction surface for the inflatable bladder 142 when transitioning from the non-expanded state (e.g., FIG. 1A) to the expanded state (e.g., FIG. 1B). One of the distinguishing characteristics in this particular embodiment is that the trajectory control arms are integrally formed with the reaction plate 178. By way of explanation, the reaction plate 178 is fabricated, at least partially, from a metallic material—i.e., stamped from aluminum or steel sheet stock. A first pair of trajectory control arms 156 is integrally formed at one lateral end of the reaction plate 178, while a second pair of trajectory control arms 158 is integrally formed at a second lateral end.

Each of the first pair of controls arms 156 is fixed at a respective first end thereof to a first lateral side portion 141 of the bladder 142, along the forward panel portion 144. Likewise, each of the second pair of control arms 158 is fixed at a respective first end thereof to a second lateral side portion 143 of the bladder 142, along the forward panel portion 144. Comparable to the embodiments discussed above, the first pair of control arms 156 are each formed with a hole 160 through the first end thereof. Each hole 160 is configured to receive a complementary stud 162, which is insert molded into the forward-facing panel portion 144 of the bladder 142. A nut (shown at 64 in FIG. 2) is then threaded onto a distal end of the stud 162, and tightened until the control arm 156 is locked to the bladder 142. Likewise, the second pair of control arms 158 are also formed with a hole 166 through the first end thereof. Each hole 166 is configured to receive a complementary stud 168, which is insert molded into the forward panel portion 144 of the bladder 142, and locked thereto with a nut.

The reaction plate 178 is configured to operatively attach to the vehicle 10, inside the IP 16. In general, the reaction plate 78 is mounted to an inner support structure of the vehicle 10, such as cross-car beam 80, which extends laterally inside of the instrument panel 16. In this particular embodiment, the reaction plate 178 is rigidly mounted to the cross-car beam 80 via first and second knee bolster brackets 182 and 184, respectively. The first and second knee bolster brackets 182, 184 are respectively configured to receive a first and a second set of bolts 112 and 114, respectively, that are passed through the reaction plate 178, thereby fixedly attaching the reaction plate 178 to the brackets 182,184. In addition, the top portions of control arms 156 would be hooked under the rearward surfaces of bracket 182, and the top portions of control arms 158 would be hooked under the rearward surfaces of bracket 184. Thus, during deployment the outer portion of control arms 156, 158 would bend about the hooked-in portion at brackets 182, 184, causing the arcing motion of the inflating bladder 142. Upon loading, the control arms 156, 158 are pushed into the openings in brackets 182, 184, and pivot about their lower attachment location to reaction plate 178. This approach provides a means for the bracket arms to be pushed forward in vehicle into the IP structure as the rearward deployed surface 146 of the inflated bladder 142 is loaded by an occupant.

Figure 5:
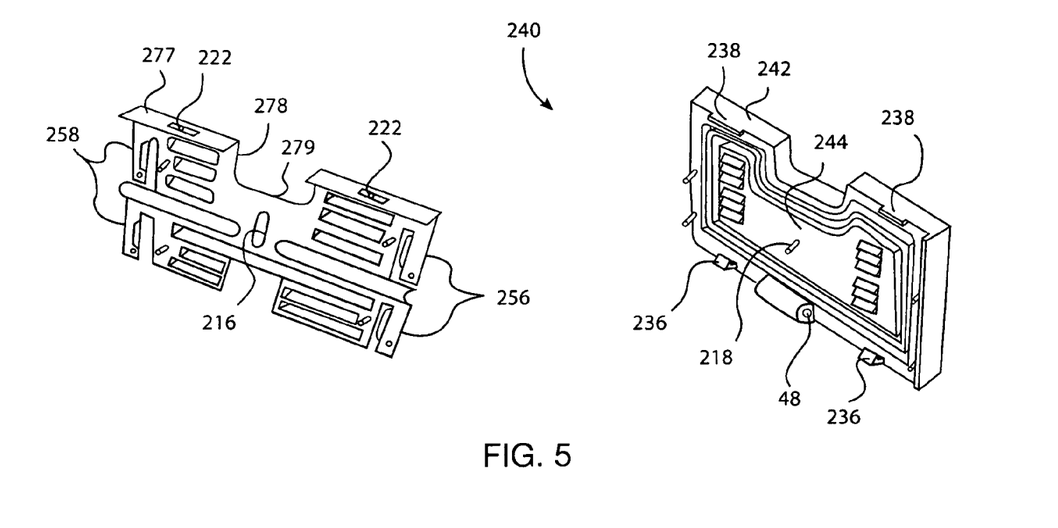
FIG. 5 is an exploded, perspective-view illustration of an inflatable restraint system in accordance with yet another embodiment of the present invention.

Turning then to FIG. 5, an exploded perspective view of an inflatable restraint system, designated generally as 240, is illustrated in accordance with another alternate embodiment of the present invention. The inflatable restraint system 240, like the embodiments discussed hereinabove, includes an expandable, yet rigid bladder 242, an inflation fluid dispensing apparatus 48, and a reaction plate 278. The constituent members of the inflatable restraint system 240 of FIG. 5 provide the same general functions as their corresponding counterparts discussed with respect to FIGS. 2 and 4.

The embodiment of FIG. 5 presents an added supplementary feature of the present invention. The inflatable restraint system 240 includes a vertical travel stop feature. In the exemplary configuration of FIG. 5, the reaction plate 278 is fabricated with an elongated slot 216 that receives and mates with a travel stop pin 218. The travel stop pin 218 projects outward from the forward panel portion 244 of the bladder 242. When the inflatable restraint system 240 is properly installed into a vehicle, the travel stop pin 218 is slidably fit within the slot 216. When the bladder 242 is activated, the travel stop pin 218 will bottom out against an upper edge of the slot 216 when the bladder 242 travels a predetermined vertical distance while transitioning from the non-expanded state to the expanded state.

In this particular arrangement, the bladder 242 is operatively attached to the vehicle 10 by releasably attaching the bladder 242 to the reaction plate 278, provided to allow for free movement of the bladder 242 subsequent to deployment, during the transition to the expanded state. Unlike the embodiments of FIGS. 2 and 4, the embodiment of FIG. 5 includes a number of snap-fastener features for releasably engaging the bladder 242 with the plate 278. In this instance, a first pair of integrally formed and frangible snap fasteners 236 (FIG. 5) extend from a bottom edge of the bladder 242 for a snap-fit engagement with the lower edge of the reaction plate 278. Likewise, a second pair of integrally formed and frangible snap fasteners 238 extend from an upper edge of the bladder 242 for receipt by a corresponding fastener slot 222 formed through an upper flange 277 in the reaction plate 278. By pressing the forward-facing panel portion 244 of the bladder 242 against the rearward-facing surface 279 of the reaction plate 278, the bladder 242 is temporarily engaged with the reaction plate 278, and releasable therefrom upon activation of the inflation device 48.

Figure 7:
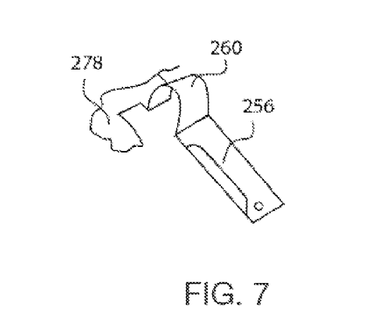
FIG. 7 is a perspective view illustration of another optional control strap configuration in accordance with the present invention.

Similar to the embodiment of FIGS. 1A and 1B, the reaction plate 278 operates as a reaction surface for the inflatable bladder 242 when transitioning from the non-expanded state (e.g., FIG. 1A) to the expanded state (e.g., FIG. 1B). Similar to the embodiment of FIG. 4, the trajectory control arms are integrally formed with the reaction plate 278. The reaction plate 278 is preferably fabricated from a metallic material, stamped from aluminum or steel sheet stock. A first pair of trajectory control arms 256 is integrally formed at one lateral end of the reaction plate 278, while a second pair of trajectory control arms 258 is integrally formed at a second lateral end. As seen in FIG. 7, one or both of the trajectory control arms 256 may include an extension loop 260 to allow for a longer overall arm length that packaging constraints may otherwise prevent. The trajectory control arms 256, 258 may also contain a bent flange so that a sharp edge is not adjacent the expanding portion of the bladder. Alternatively, a coating or cover can be placed over the trajectory control arms to eliminate sharp edge contact with the expanding portion of the bladder.

FIG. 8 is a cross-sectional, side-view illustration of an inflatable rigid bladder 442 with an optional exterior show-surface panel 410 and intermediate stiffener panel 412 in accordance with the present invention. The bladder 442 may be fabricated from a particular first material of a predetermined rigidity that provides for sufficient robustness to maintain the requisite shape of the knee bolster, allow for proper installation into the vehicle, and sufficient "inflatability" characteristics. The stiffener panel 412, on the other hand, is fabricated, at least partially, from a different, second material that is harder and more rigid than the bladder's material to ensure that the bladder 442 is evenly loaded over a large area by the occupant's knees. The show-surface panel 410 on the other hand is intended to provide a customer visible, aesthetically appealing surface.

While the best modes for carrying out the present invention have been described in detail herein, those familiar with the art to which this invention pertains will recognize various alternative designs and embodiments for practicing the invention within the scope of the appended claims.

The invention claimed is:

1. An inflatable restraint system for a vehicle having a passenger compartment with an instrument panel at a forward end therein, the inflatable restraint system comprising:
    a bladder having forward and rearward panel portions, wherein said bladder is operatively attachable to the instrument panel, and configured to transition from a non-expanded state, in which said rearward panel portion is substantially flush with respect to the instrument panel, to an expanded state, in which said rearward panel portion is extended into the passenger compartment distal from the instrument panel;
    an inflation device in operative communication with said bladder and configured to selectively transition said bladder from said non-expanded state to said expanded state; and
    at least one trajectory control arm attached at a first end thereof to said bladder, and operatively attachable at a second end thereof to the vehicle, wherein said at least one trajectory control arm is configured to at least partially redirect said bladder along a generally upward path when transitioning from said non-expanded state to said expanded state.

2. The inflatable restraint system of claim 1, wherein said at least one trajectory control arm comprises first and second control straps each fixed at said first end thereof to a respective lateral side portion of said bladder.

3. The inflatable restraint system of claim 1, wherein said at least one trajectory control arm is fixed at said first end thereof to a central portion of said bladder.

4. The inflatable restraint system of claim 1, wherein said at least one trajectory control arm includes a first anchor plate attaching said first end to said bladder and a second anchor plate configured for attaching said second end to the vehicle.

5. The inflatable restraint system of claim 1, further comprising:
    a reaction plate configured to operatively attach to the vehicle inside the instrument panel, and operatively attached to said bladder via said at least one trajectory control arm.

6. The inflatable restraint system of claim 5, wherein said reaction plate is rigidly mounted to the vehicle via one of at least one separate knee bolster bracket and first and second knee bolster brackets are integrally formed with said reaction plate.

7. The inflatable restraint system of claim 6, wherein at least one of said trajectory control arms hinges to a knee bolster bracket at a first location during deployment, and hinges at a second location lower than said first location during occupant loading such that said at least one trajectory control arm is pushed forward relative to the vehicle during loading.

8. The inflatable restraint system of claim 5, wherein said reaction plate is fabricated at least partially from a metallic material, and wherein said at least one trajectory control arm is integrally formed with said metallic reaction plate.

9. The inflatable restraint system of claim 8, wherein said at least one trajectory control arm includes an extension loop.

10. The inflatable restraint system of claim 5, wherein said reaction plate defines a slot configured to receive and mate with a travel stop projecting from said forward panel portion of said bladder, said travel stop configured to bottom out against said slot when said bladder travels a predetermined vertical distance while transitioning from said non-expanded state to said expanded state.

11. The inflatable restraint system of claim 5, further comprising:
    a reverse travel mechanism configured to prevent said bladder from transitioning back from said expanded state to said non-expanded state.

12. The inflatable restraint system of claim 11, wherein said reverse travel mechanism includes a first at least one triangular tooth protruding from said forward panel portion of said bladder, and configured to land against a second at least one triangular tooth protruding from a rearward surface of said reaction plate if said bladder transitions downward with respect to a plane of attachment during loading.

13. The inflatable restraint system of claim 1, wherein said bladder is a single-piece, monolithic structure.

14. The inflatable restraint system of claim 1, wherein said bladder defines a plurality of bellows configured such that said rearward panel portion articulates away from said forward panel portion when said bladder transitions from said non-expanded state to said expanded state.

15. The inflatable restraint system of claim 14, wherein at least one of said plurality of bellows extends continuously along an outer perimeter of said forward panel portion.

16. The inflatable restraint system of claim 15, wherein said at least one trajectory control arm comprises first and second control straps each fixed at said first end thereof to a respective lateral side portion of said bladder laterally outward of said plurality of bellows.

17. The inflatable restraint system of claim 1, further comprising:
    a stiffener panel operatively attached to said rearward panel portion of said bladder, wherein said bladder is fabricated at least partially from a first material, and said stiffener panel is fabricated at least partially from a second material harder than said first material.

18. The inflatable restraint system of claim 1, further comprising:
    a steering column shroud operatively attached to an upper edge portion of said bladder and configured to expand from a stored position to an expanded position in between a steering column of the vehicle and said bladder;

wherein transitioning said bladder from said non-expanded state to said expanded state operates to expand said steering column shroud from said stored position to said expanded position.

19. An inflatable knee bolster apparatus for selectively restraining an occupant of a motor vehicle having a passenger compartment with an instrument panel mounted at a forward end therein, the instrument panel including an upper portion and a rearwardly-inclined lower portion with a generally-vertical middle portion extending therebetween, the inflatable knee bolster apparatus comprising:

a rigid bladder having forward and rearward panel portions cooperatively defining a fluid chamber therebetween, wherein said bladder is operatively attachable to the lower portion of the instrument panel, and configured to transition from a non-expanded state, in which said rearward panel portion is substantially flush with respect to the instrument panel, and an expanded state, in which said rearward panel portion is extended into the passenger compartment distal from the instrument panel;

a fluid dispensing apparatus fluidly coupled to said fluid chamber and selectively operable to dispense inflation fluid thereto, wherein activation of said fluid dispensing apparatus operates to transition said bladder from said non-expanded state to said expanded state; and a plurality of trajectory control arms each fixed at a first end thereof to said bladder, and operatively attachable at a second end thereof to the vehicle, wherein said plurality of trajectory control arms are configured to redirect said bladder along an arcuate path when transitioning from said non-expanded state to said expanded state.

20. A vehicle having a passenger compartment, the vehicle comprising:

an instrument panel mounted at a forward end of the vehicle passenger compartment, said instrument panel having an upper portion and a rearwardly-inclined lower portion with a generally-vertical middle portion extending therebetween;

an inflatable knee airbag apparatus, including:

a rigid bladder having integrally formed forward and rearward panel portions cooperatively defining a fluid chamber therebetween, wherein said bladder is operatively mounted to said lower portion of said instrument panel, and configured to transition from a non-expanded state, in which said rearward panel portion is substantially flush with respect to the instrument panel, and an expanded state, in which said rearward panel portion is extended into the passenger compartment distal from the instrument panel;

a fluid dispensing apparatus fluidly coupled to said fluid chamber and selectively operable to dispense inflation fluid thereto, wherein activation of said fluid dispensing apparatus operates to transition said bladder from said non-expanded state to said expanded state;

a reaction plate mounted to a support structure of said vehicle inside said instrument panel; and a plurality of trajectory control arms each fixed at a first end thereof to said forward panel portion of said bladder at a first height, and integrated at a second end thereof to said reaction plate at a second height higher than said first height, wherein said plurality of trajectory control arms are configured to redirect said rearward panel portion of said bladder in an upward motion along an arcuate path when transitioning from said non-expanded state to said expanded state.

* * * * *